United States Patent
Sollenberger et al.

(10) Patent No.: US 7,945,258 B2
(45) Date of Patent: May 17, 2011

(54) WIRELESS DEVICE OPERABLE TO MANIPULATE HIGH-SPEED SHARED CONTROL CHANNEL (HSSCCH) QUALITY CONTROL THROUGH CHANNEL QUALITY INDICATION REPORT MANIPULATION

(75) Inventors: Nelson R. Sollenberger, Farmingdale, NJ (US); Li Fung Chang, Holmdel, NJ (US); Xiaoxin Qiu, Bridgewater, NJ (US); Hongwei Kong, Denville, NJ (US); Severine Catreux, Cardiff, CA (US)

(73) Assignee: Broadcom Corporation, Irvine, CA (US)

( * ) Notice: Subject to any disclaimer, the term of this patent is extended or adjusted under 35 U.S.C. 154(b) by 785 days.

(21) Appl. No.: 11/935,163

(22) Filed: Nov. 5, 2007

(65) Prior Publication Data
US 2009/0036117 A1 Feb. 5, 2009

Related U.S. Application Data

(60) Provisional application No. 60/952,908, filed on Jul. 31, 2007.

(51) Int. Cl.
*H04W 24/00* (2009.01)
(52) U.S. Cl. ............ 455/423; 455/63.1; 455/67.13; 455/418; 455/424; 455/425; 455/434; 455/501; 455/504; 370/310.2; 370/317; 370/328

(58) Field of Classification Search ............ 455/418, 455/423, 24, 425, 434, 501, 504, 63.1, 67.13; 370/310.2, 317, 328
See application file for complete search history.

(56) References Cited

U.S. PATENT DOCUMENTS

| | | | | |
|---|---|---|---|---|
| 5,896,411 | A | * | 4/1999 | Ali et al. .................. 375/130 |
| 6,850,771 | B2 | * | 2/2005 | Malladi et al. ............. 455/522 |
| 7,317,702 | B2 | * | 1/2008 | Dominique et al. ........ 370/328 |
| 7,492,722 | B2 | * | 2/2009 | Pietraski et al. ........... 370/252 |
| 2003/0123396 | A1 | * | 7/2003 | Seo et al. .................. 370/252 |
| 2005/0003782 | A1 | * | 1/2005 | Wintzell .................. 455/226.3 |
| 2005/0100038 | A1 | * | 5/2005 | Pietraski et al. ........... 370/437 |
| 2008/0063095 | A1 | * | 3/2008 | Khayrallah ................ 375/260 |

* cited by examiner

*Primary Examiner* — Stephen M D'Agosta
(74) *Attorney, Agent, or Firm* — Garlick Harrison & Markison; Bruce E. Garlick

(57) ABSTRACT

A method to adapt channel quality indicator (CQI) reports from user equipment (UE) is provided. This involves first determining the presence of a high-speed shared control channel (HS-SCCH) signal. An estimated signal to noise ratio (SNR) is also determined. Next an SNR correction based on the presence or lack thereof of the HS-SCCH signal and the CRC checks for HS-SCCH and HS-DSCH signals are determined and applied to the estimated SNR. The CQI report is then generated based on the corrected estimated SNR. This CQI report which takes into account a corrected estimated SNR may then be used to adjust the HS-SCCH signal in an HSDPA telephony system.

20 Claims, 8 Drawing Sheets

WIRELESS DEVICE OPERABLE TO MANIPULATE HIGH-SPEED SHARED CONTROL CHANNEL (HSSCCH) QUALITY CONTROL THROUGH CHANNEL QUALITY INDICATION REPORT MANIPULATION

CROSS REFERENCE TO RELATED APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 60/952,908, entitled "WIRELESS DEVICE OPERABLE TO MANIPULATE HIGH-SPEED SHARED CONTROL CHANNEL (HSSCCH) QUALITY CONTROL THROUGH CHANNEL QUALITY INDICATION REPORT MANIPULATION," filed 31 Jul. 2007, pending.

TECHNICAL FIELD OF THE INVENTION

The present invention relates generally to cellular wireless communication systems, and more particularly to the downlink quality control within a wireless terminal of a cellular wireless communication system that supports high speed downlink packet access (HSDPA).

BACKGROUND OF THE INVENTION

Cellular wireless communication systems support wireless communication services in many populated areas of the world. While cellular wireless communication systems were initially constructed to service voice communications, they are now called upon to support data and video (multimedia) communications as well. The demand for video and data communication services has exploded with the acceptance and widespread use video capable wireless terminals and the Internet. Video and data communications have historically been serviced via wired connections; cellular wireless users now demand that their wireless units also support video and data communications. The demand for wireless communication system video and data communications will only increase with time. Thus, cellular wireless communication systems are currently being created/modified to service these burgeoning demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to controllers, with each controller serving a plurality of Node B's. Each controller also typically directly or indirectly couples to the Internet. In the $3^{rd}$ Generation Partnership Agreement (3GPP) these base stations may be referred to as "Node B's" and the wireless terminals may be referred to as user equipment (UE).

In operation, each Node B communicates with a plurality of wireless UEs operating in its cell/sectors. A controller coupled to the Node B routes voice, video, data or multimedia communications between the MSC and a serving base station. Typically, controllers route data communications between a servicing Node B and a packet data network that may include or couple to the Internet. Transmissions from base stations to wireless terminals are referred to as "forward link" or "downlink" transmissions while transmissions from wireless terminals to base stations are referred to as "reverse link" or "uplink" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single Node B forces the need to divide the forward and reverse link transmission resources (depending on the specific wireless standards, the resources could be frequency band, time slot, orthogonal code, and transmit power) amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. The GSM standard has evolved in part into the $3^{rd}$ Generation Partnership Agreement (3GPP). 3GPP provides Technical Specifications and Technical Reports for a 3rd Generation Mobile System based on evolved GSM core networks and the radio access technologies that they support (i.e., UMTS Terrestrial Radio Access (UTRA) both Frequency Division Duplex (FDD) and Time Division Duplex (TDD) modes). The scope also includes the maintenance and development of the Global System for Mobile communication (GSM) Technical Specifications and Technical Reports including evolved radio access technologies (e.g. General Packet Radio Service (GPRS) and Enhanced Data rates for GSM Evolution (EDGE)). While GSM originally serviced only voice communications, it has been modified to also service data communications. General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC). The UMTS technology is an adaptation of the WCDMA 3G system by GSM. One reason for the high data rates that may be achieved by UMTS technology stems from the 5 MHz WCDMA channel bandwidths versus the 200 KHz GSM channel bandwidths. HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates.

In some instances, HSDPA may provide an improvement in network capacity as well as data speeds higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, adaptive modulation/coding of HSDPA data channel (HS-DSCH) based on channel quality feedback information from the UE may be possible. Also, the HS-SCCH power setting may be based on channel quality feedback from the UE. However, implementing advanced wireless technologies such as WCDMA and/or HSDPA may still require overcoming some architectural hurdles because of the very high-speed, wide bandwidth data transfers possible. For example, multiple-input multiple-output (MIMO) antenna architectures, and multipath processing receiver circuitry may be implemented to process the high speed, high bandwidth received RF signals to digital data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE DRAWINGS

Preferred embodiments of the present invention are illustrated in the FIGS., like numerals being used to refer to like and corresponding parts of the various drawings.

Embodiments of the present invention provide a system and method to adapt CQI reports from UEs. The function is activated when UE detects the quality targets for HSDPA channels (HS-SCCH and/or HS-DSCH) are not met This involves first determining the presence of a HS-SCCH signal. An estimated SNR is also determined. Next an SNR correction based on the presence or lack thereof of the HS-SCCH signal and the CRC check results on the HS-SCCH and the HS-DSCH, is determined and applied to the estimated SNR. The CQI report is then generated based on the corrected estimated SNR. This CQI report which takes into account a corrected estimated SNR may then be used by the Node B to adjust HSDPA channel parameters such as the HS-SCCH and/or HS-PDSCH signal level, HS-DSCH modulation/coding format, etc., in an HSDPA capable system.

Figure 1:
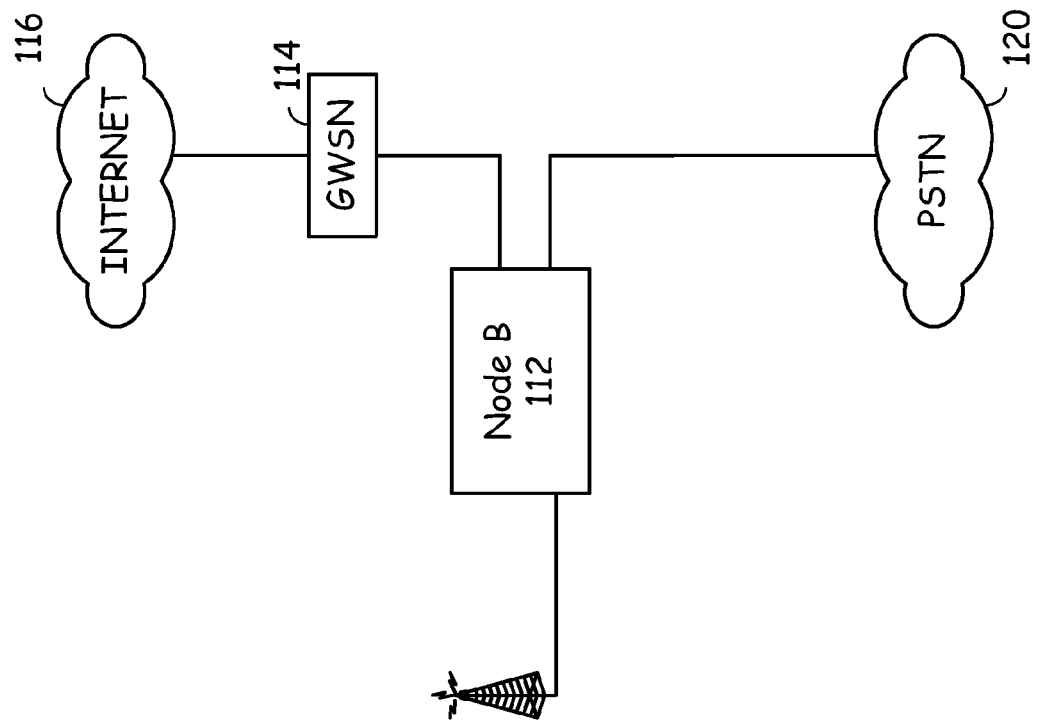
FIG. 1 is a system diagram illustrating a portion of a cellular wireless communication system that supports wireless terminals operating according to embodiments of the present invention.
Figure 1:
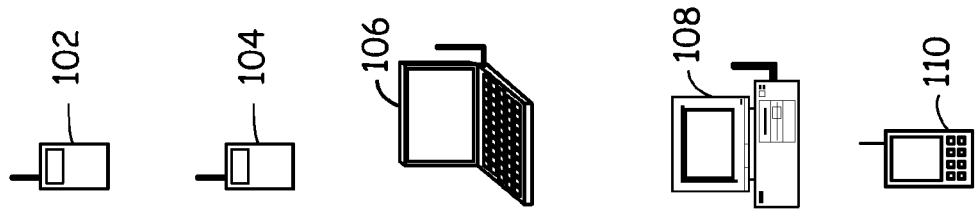

FIG. 1 is a system diagram illustrating a portion of a cellular wireless communication system 100 that supports an exemplary HSDPA distributed architecture in accordance with embodiments of the present invention. The cellular wireless communication system 100 includes a user equipment (UEs) 102, 104, 106, 108 and 110, a 3GPP capable Node B 112, and a Node B of a Universal Mobile Telecommunications System (UMTS) third-generation (3G) mobile phone systems may couple to the Internet 116 via a GPRS Gateway Support Node (GWSN) 114. MSC 118 couples Node B 112 to the Public Switched Telephone Network (PSTN) 120.

Each Node B services a cell/set of sectors within which it supports wireless communications. Wireless links that include both forward link components and reverse link components support wireless communications between the base stations and their serviced wireless terminals. These wireless links support digital voice, video, multimedia, and data communications. The cellular wireless communication system 100 may also be backward compatible in supporting analog operations as well. The cellular wireless communication system 100 supports an adaptation of the WCDMA 3G system by GSM, HSDPA. UEs 102-110 support HSDPA communications. UEs 102-110 communicate with Node B via the MAC-hs for packet transmission and retransmission. Several new physical channels and a transport channel. However, embodiments of the present invention are also applicable to other standards as well, e.g., TDMA standards, CDMA standards, etc.

HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. The HSDPA technology may also utilize variable coding rates.

Figure 2:
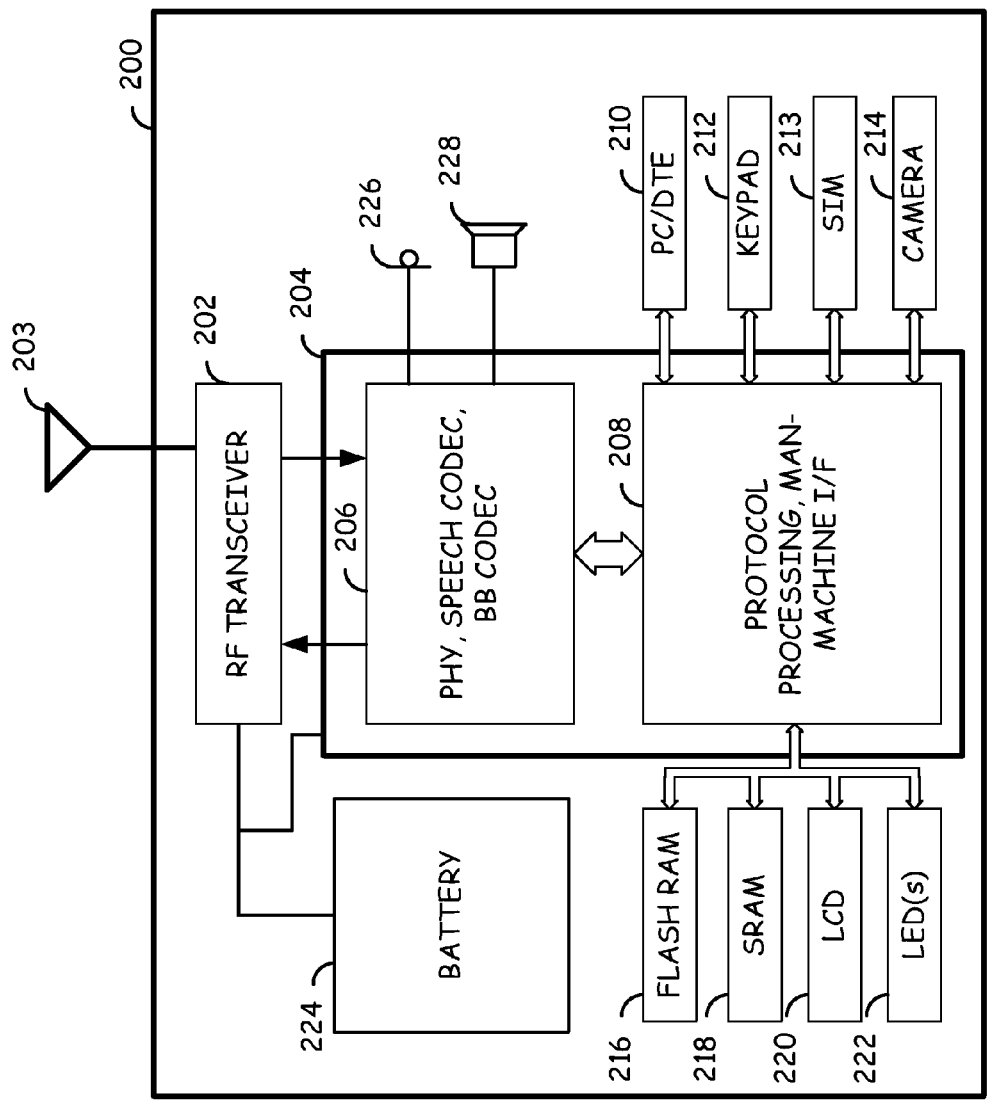
FIG. 2 is a block diagram functionally illustrating a wireless terminal or ULE constructed according to embodiments of the present invention.

FIG. 2 is a block diagram functionally illustrating a wireless terminal (UE) 200 constructed according to embodiments of the present invention. The wireless terminal 200 of FIG. 2 includes an RF transceiver 202, digital processing components 204, and various other components contained within a case. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
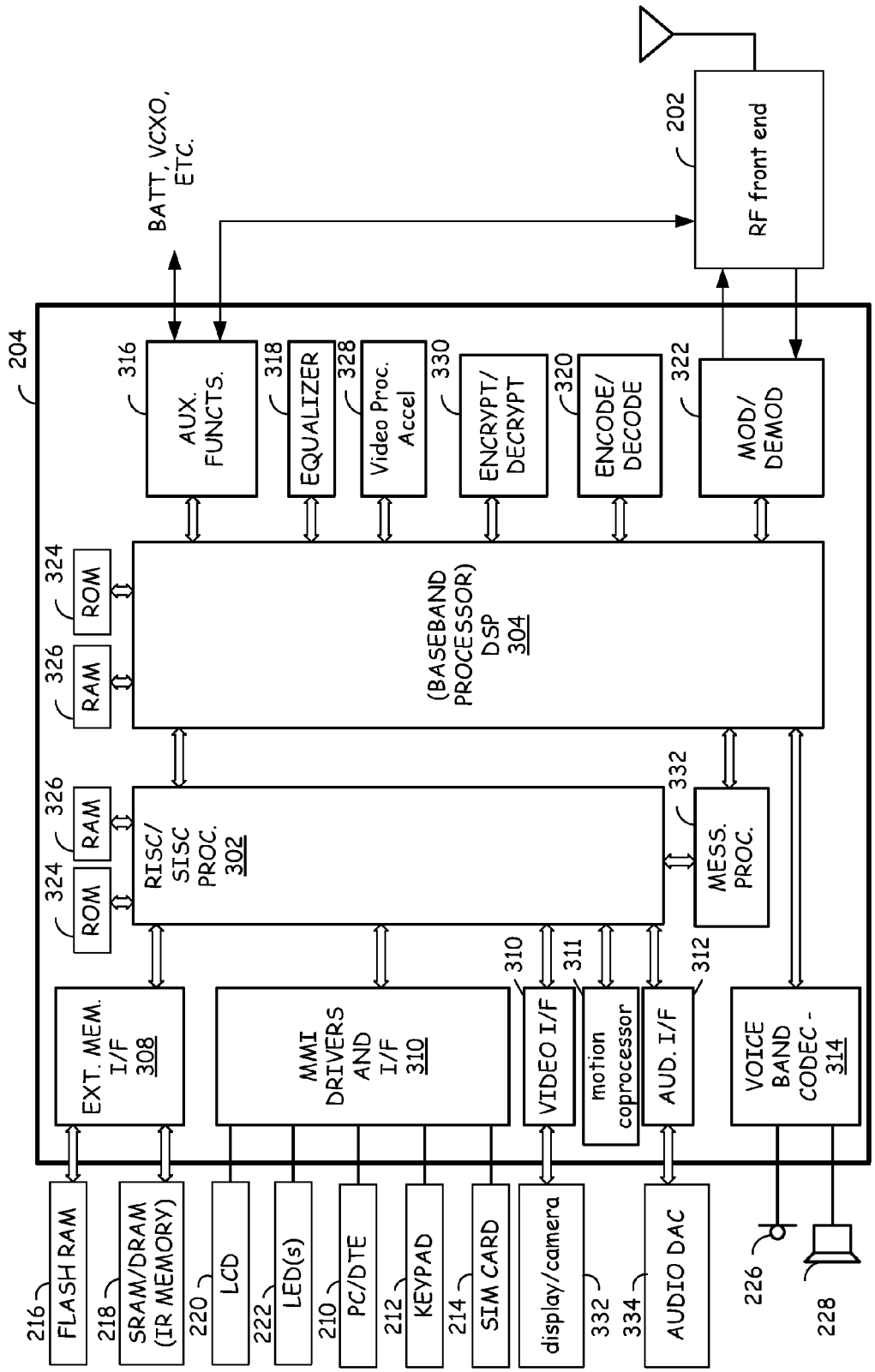
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, a motion coprocessor 311, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and a video process accelerator module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and base band processor 204, which may include an optional CODEC processing module, receive RF communications that may contain both audio and visual information from the servicing base station. In one embodiment the RF front end 202 and base band processor 204 receive and process RF bursts from servicing base stations. The combination of RF front end 202 and base band processor 204 are operable to receive RF bursts transmitted according to a transmission scheme wherein the transmission scheme includes both a modulation format and a coding format. Base band processor 204 to produce a data block decodes sequences of soft decisions, extracted from the RF burst s. The sequence of soft decisions may decode successfully into the data block as indicated by error correction coding results.

HSDPA provides increased data transfer speeds and network capacity. Current HSDPA deployments support 1.8 Mbit/s, 3.6 Mbit/s, 7.2 Mbit/s and 14.4 Mbit/s in downlink with additional speed upgrades planned for the future. Various new physical and transport channels are introduced with HSDPA. These include high speed shared control channel (HS-SCCH), high speed dedicated physical control channel (HS-DPCCH), high speed downlink shared transport channel (HS-DSCH) and high speed physical downlink shared channel (HS-PDSCH). The HS-DSCH is used to send packets on the downlink to the UEs The HS-SCCH informs the user that data will be sent on the HS-DSCH 2 slots ahead. The HS-DPCCH carries acknowledgment information and current channel quality indicator (CQI) of the user. This value is then used by the Node-B in calculating how much data to send to the UE on the next transmission. HS-PDSCH is the physical channel mapped to the above HS-DSCH transport channel that carries actual user data.

The HS-DSCH downlink channel is shared between users and takes advantage of channel conditions to make the best use of available radio conditions. Each user device periodically (approximately 500 times per second based on a 2 ms transmission time interval (TTI)) transmits an indication of the downlink signal quality.

This information on the downlink signal quality allows Node B to adapt literally every data block to account for fast changing radio conditions by the means of adaptive modulation and coding (AMC). Thus it is possible to counteract the fading on the air-interface by adjusting modulation and coding almost every 2 ms depending on Node B's processing delay and packet scheduling. Node B uses the downlink signal quality information received from all user devices to decide which users will be sent data on the next 2 ms frame and, for each user, how much data should be attempted. More data can be sent to users which report high downlink signal quality To maintain the HSDPA quality target Node B is required to detect an acknowledgment (ACK), negative acknowledgement (NACK) and discontinuous transmission (DTX). ACK is a one-bit indication used by the Hybrid Automatic Repeat Request (HARQ) protocol to indicate a successful transmission on the High Speed Downlink Shared Channel (HS-DSCH). A NACK indicates data has been received incorrectly, for example it may have a checksum or message length error. The NACK is sent from the receiving unit to the transmitting unit and may cause the packet to be retransmitted. DTX is a method of momentarily powering-down, or muting, a mobile or portable wireless telephone. The DTX is an indicator of HSSCCH quality in that an outer loop can be activated that controls HSSCCH transmit power based on whether a DTX is received when not expected. The ACK and NACK states are indicators of high speed physical downlink shared channel (HSDSCH) quality wherein an outer loop can be activated that controls the HSDSCH.

Target quality control function was not mandated by the 3GPP standards and is not standard within Node B equipment. For example, a Node B can set the HS-SCCH power to be a fixed level based on worst case coverage scenarios or based on user channel quality indications reports (CQI) reports through the use of CQI to HS-SCCH-BLER mapping tables. In the latter case a wireless terminal may suffer as it may not receive sufficient HS-SCCH power due to aggressive CQI to HS-SCCH-BLER mapping tables used within Node B. This problem impacts the HS-SCCH more than the HS-DSCH as the HARQ hybrid automatic repeat request on HSDPA is asynchronous. Therefore HS-SCCH processing in the wireless terminal does not involve joint detection of the HS-SCCH among successive transmissions of the same HARQ process.

Embodiments of the present invention provide a mechanism within the wireless terminal for UE to maintain the quality target. This is done by adding a correction factor to the measured SNR of the CQI report. The correction is dependent on the detected presence of the HSDPA channel and measured CRC results from the HS-SCCH and the HS-DSCH.

Figure 4:
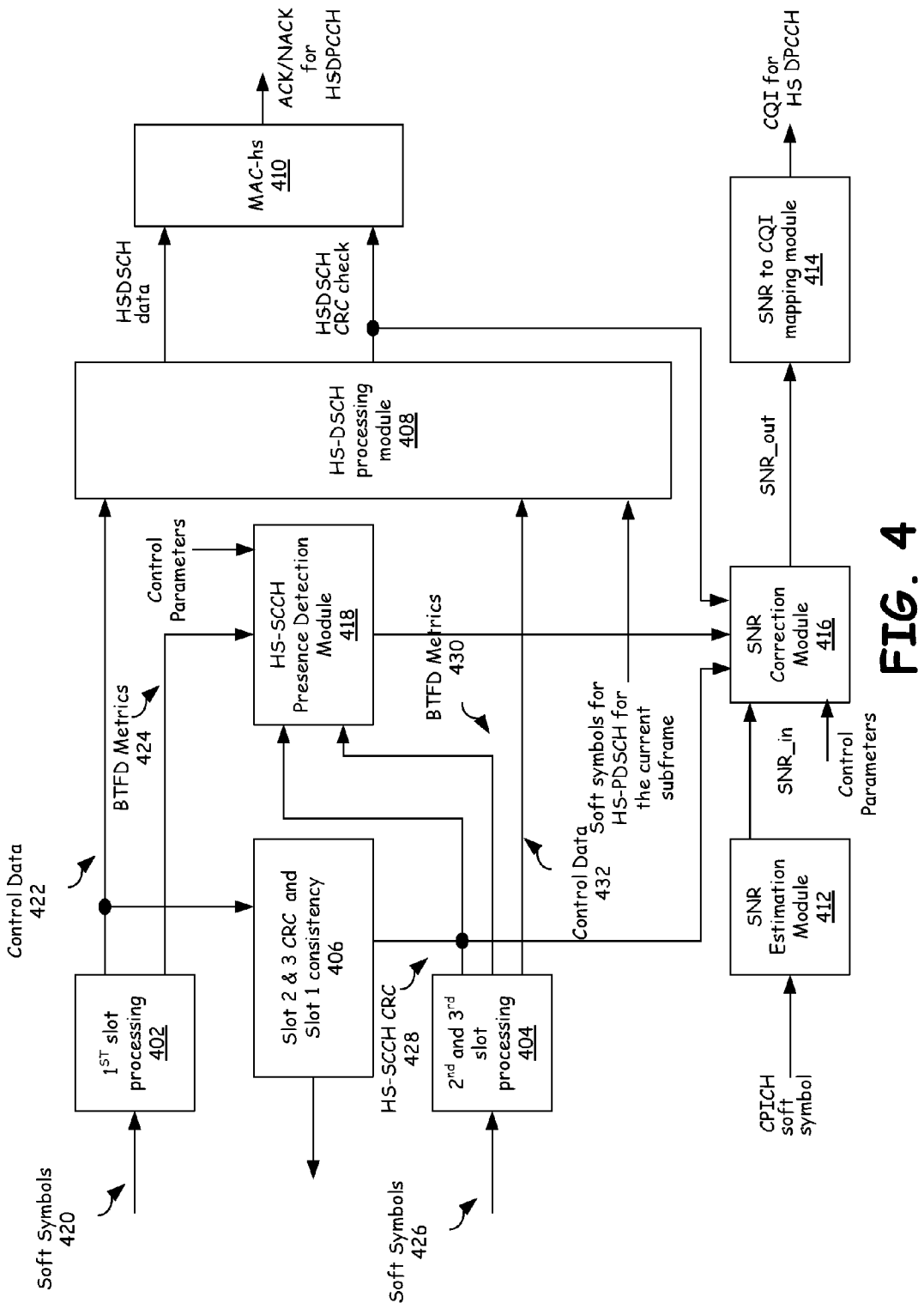
FIG. 4 provides a block diagram of HSDPA processing at the UE in accordance with embodiments of the present invention.

FIG. 4 provides a block diagram of HSDPA processing at the UE in accordance with embodiments of the present invention. HSDPA processing system 400 includes 1st slot processing module 402, $2^{nd}$ and $3^{rd}$ slot processing module 404, slots 2 and 3 CRC checks and slot 1 consistency check processing module 406, HS-DSCH processing module 408, MAC-hs module 410, SNR estimation module 412, SNR to CQI mapping module 414, SNR correction module 416 and HS-SCCH presence detection module 418. Soft symbols 420 for HS-SCCH slot 1 are received by 1st slot processing module 402. 1st slot processing module 402 produces control data 422 which is supplied to HS-DSCH processing module 408 and slots 2 and 3 CRC checks and slot 1 consistency check processing module 406. BTFD metrics 424 are also produced and supplied to HS-SCCH presence detection module 418. Soft symbols 426 for HSSCH slot 2 and slot 3 are processed using $2^{nd}$ and $3^{rd}$ slot processing module 404. $2^{nd}$ and $3^{rd}$ slot processing module 404 produces BTFD metrics 430, supplied to HS-SCCH presence detection module 418, control data 432 which is supplied to HS-DSCH processing module 408, and HS-SCCH CRC check information 428 which is supplied to HS-DSCH processing module 408, slots 2 and 3 CRC checks and slot 1 consistency check processing module 406, and SNR correction module 416. HS-SCCH presence detection module 418 will produce an HS-SCCH presence indicator that is supplied to the SNR correction module 416. The determination of the HS-SCCH presence indicator will be discussed in further detail with reference to FIGS. 6 and 7.

The basic concept of SNR correction is to add a correction to the estimated common pilot channel (CPICH) SNR output from SNR estimation module 412. The corrected SNR provided by SNR correction module 416 will then be used to generate the CQI with the SNR to CQI mapping module 414, where the CQI is to be reported in the uplink HS-DPCCH CQI channel. The correction has a fixed part ($\Delta f$) and a variable part ($\Delta v$). The fixed part ($\Delta f$) is software configurable, with a default value of 0 dB. Variable correction generation derives the adjustment amount based on the measurements (HS-SCCH CRC, HS-SCCH Presence indicator, HS-DSCH ACK/NACK), using different up step sizes and down step sizes. The up step sizes and down step sizes can be software configurable. They can be set based on target BLER values for HS-SCCH and HS-DSCH or other criteria. Control Parameters 2 contains these parameters. The total SNR correction value ($\Delta f + \Delta v$) is subject to an upper limit and a lower limit. In one embodiment, the limits are software configurable, with default values of 0 dB and −2 dB for the Upper limit and the Lower limit, respectively. Table 1, as provided below details control parameters used within the SNR correction Module 416.

TABLE 1

| Parameter Name | Description |
| --- | --- |
| Up Step Size 1 | Fixed step size added to the variable correction register when HS-SCCH is not present |
| Up Step Size 2 | Fixed step size added to the variable correction register when HS-DSCH has a CRC check |
| Down Step Size 1 | Fixed step size added to the variable correction register when HS-SCCH is present and its CRC fails. |
| Down Step Size 2 | Fixed step size added to the variable correction register when HS-DSCH CRC fails. |
| Upper_Limit_DTX | Upper limit on the variable correction when |

TABLE 1-continued

| Parameter Name | Description |
|---|---|
| Upper_Limit_TX | HS-SCCH is not present, default 0 dB. Upper limit on the variable correction when HS-SCCH is present, default 0 dB. |
| Lower_Limit_V | Lower limit on the variable correction, default −2 dB. |

Figure 5:
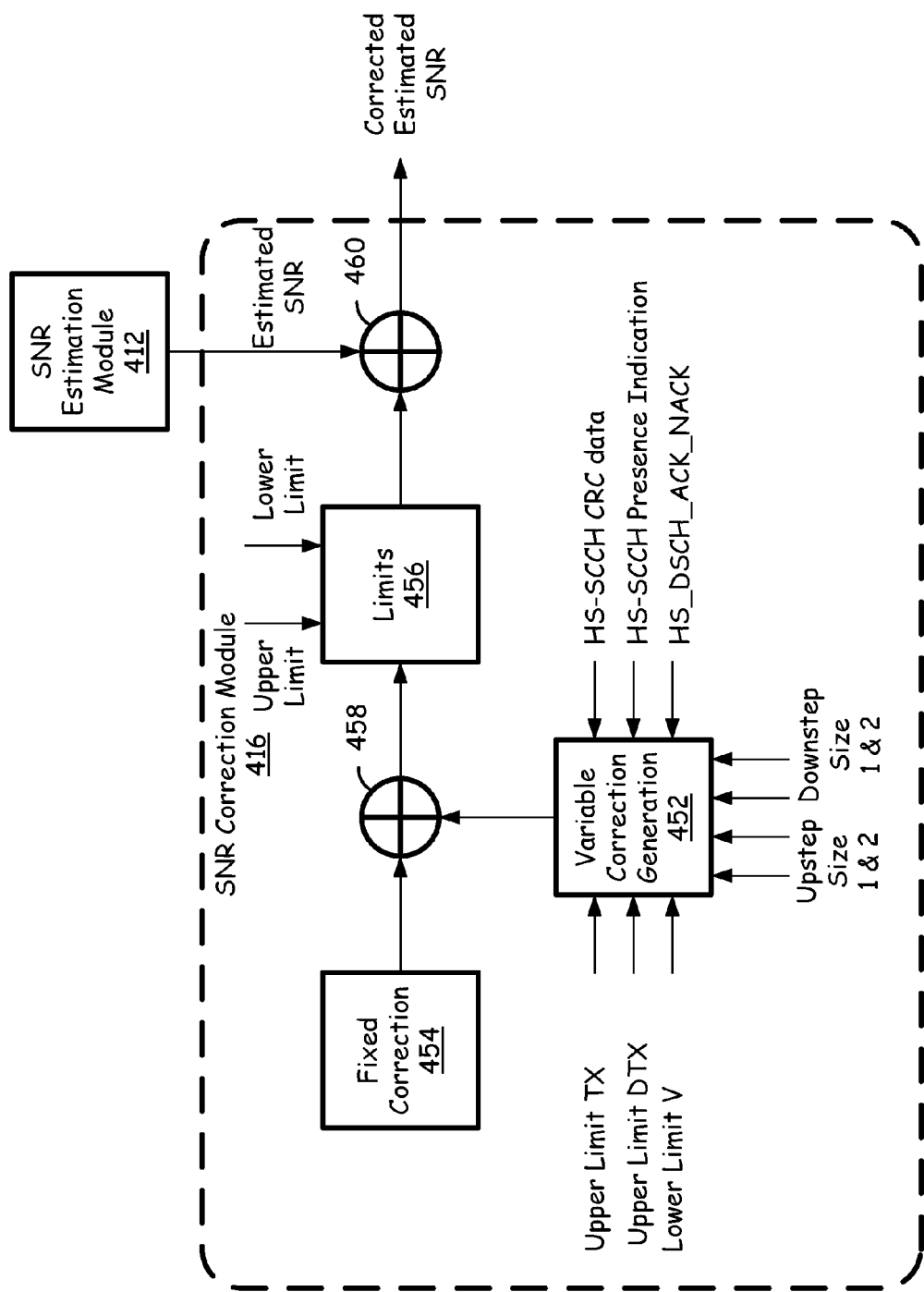
FIG. 5 provides functional diagram of SNR correction module in accordance with embodiments of the present invention.

FIG. 5 provides functional diagram of SNR correction module 416. SNR correction module 416 includes a fixed correction component 454 and variable correction component 452, a first summing module 458, SNR correction limits module 456, and a second summing module 460. Variable correction component 452 may receive a variety of inputs including if not limited to the HS-SCCH CRC data, HS-SCCH signal presence indication, HS-DSCH (ACK/NACK) control parameters upper limit DTX, upper limit TX, lower limit V, upstep size one, upstep size two, downstep size one, and downstep size two. The fixed correction and variable correction are summed using first summing module 458. The output of the first summing module is then compared to upper and lower limits within limits module 456. If the SNR correction outputted by first summing module 458 is in between the upper and lower limits that SNR correction will be applied to the SNR estimate provided by SNR estimation module 412 to produce a corrected estimated SNR which intensified to SNR to CQI napping module 414. Otherwise if the output of summing module 458 exceeds the upper limits then the SNR correction is set to the upper limit. Similarly if the SNR correction is lower than the lower limit then the lower limit is applied.

Figure 6:
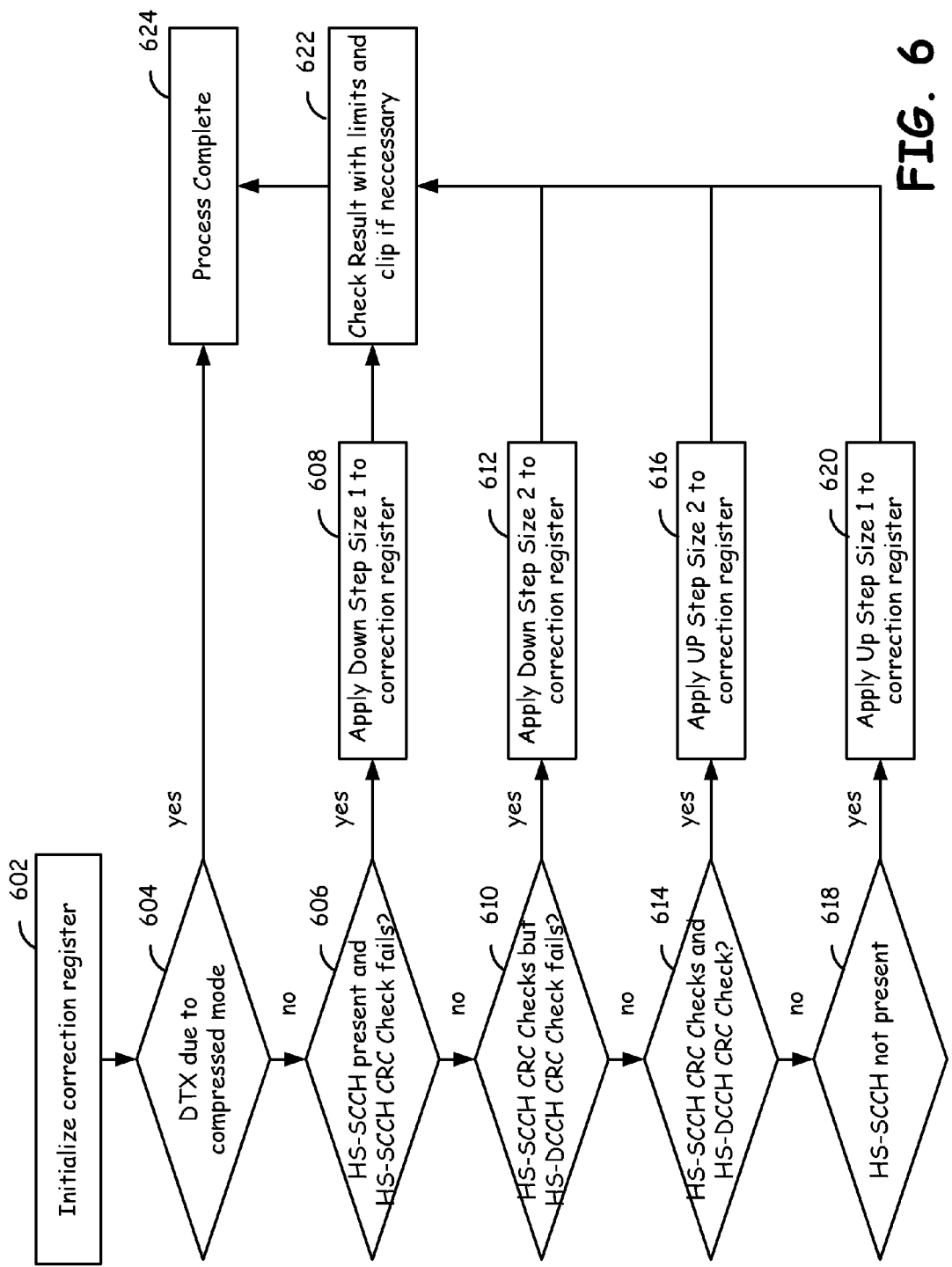
FIG. 6 is a flow chart illustrating variable correction generation within a wireless terminal in accordance with embodiments of the present invention.

The variable correction generation is generated in accordance with the logic flow diagram of FIG. 6. Operations 600 begin with step 602 that initializes the correction register to 0 (dB). For every subframe a determination is made at decision point 604 as to whether or not a DTX is there. A DTX due to compressed mode is known a priori to UE so UE does not need to detect or observe this. If a DTX is there, if so nothing else is done and the process is complete at step 624. Otherwise the process determines the presence of the HS-SCCH signal in step 606. If the HS-SCCH is present and the HS-SCCH CRC fails at decision point 606, the correction register is decreased by 'Down Step Size1' dB in step 608. If HS-SCCH CRC checks but HS-DSCH CRC fails at decision point 610, the correction register is decreased by 'Down Step Size2' dB in step 612. If HS-SCCH CRC checks and HS-DSCH CRC checks at decision point 614, the correction register is increased by 'Up Step Size2' dB in step 616. If HS-SCCH is not present as determined at decision point 618, the correction register is increased by 'Up Step Size1' dB in step 620. These results are checked with the limits and clipped to the applicable limit when the results are beyond the limits in step 622. In one embodiment the default values for the step sizes are as follows:

| Down StepSize1: | 1 dB |
| Up Step Size1: | 0.004 dB |
| Up Step Size2: | 0.002 dB |
| Down Step Size2: | 0.1 dB/0.02 dB (see next slide for how to use the two values) |

Figure 7:
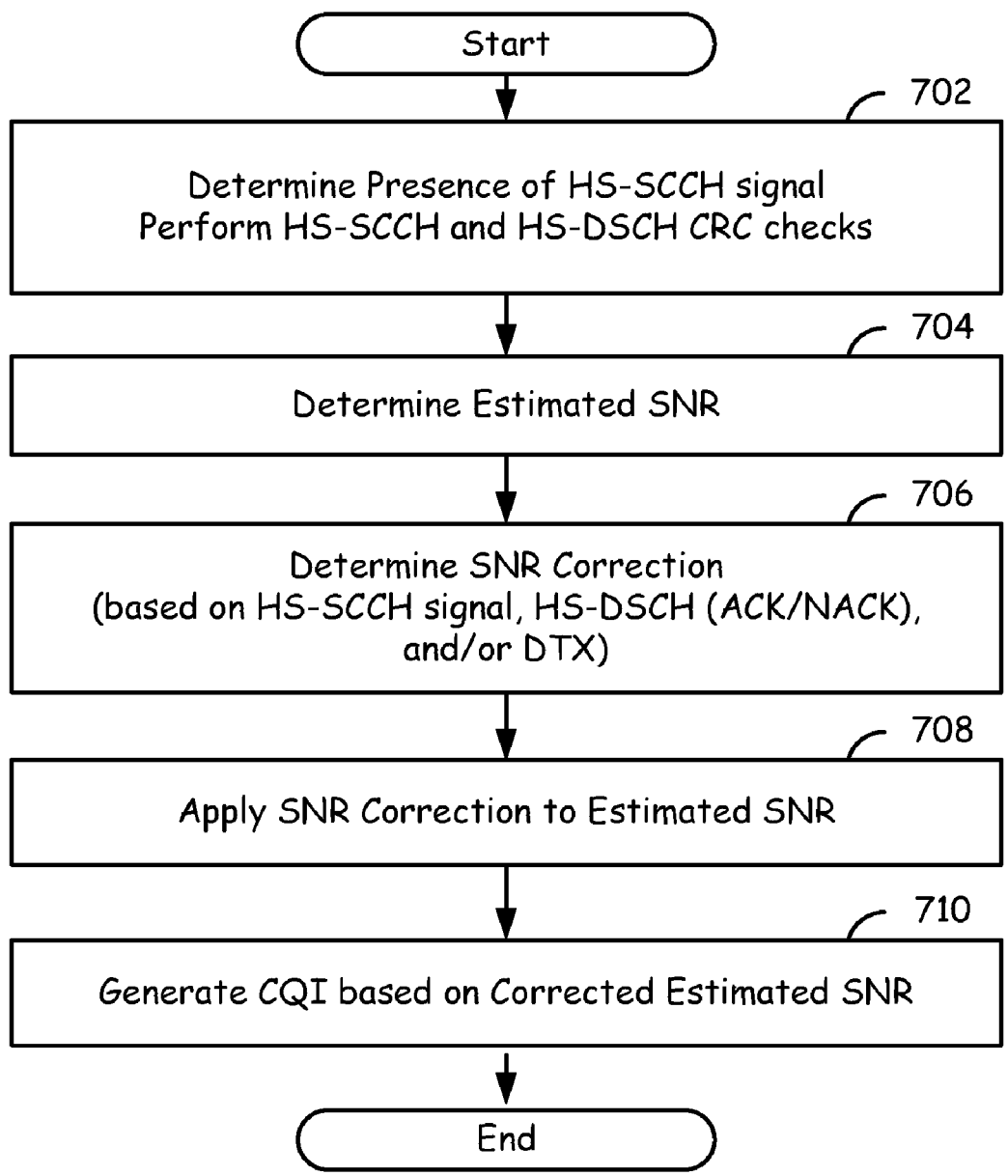
FIG. 7 provides a logic flow diagram in accordance with embodiments of the present invention that describes a method to adapt CQI reports from user equipment (UE)

FIG. 7 provides a logic flow diagram in accordance with embodiments of the present invention that describes a method to adapt CQI reports from user equipment (UE). This adapted CQI report may then be further used to adjust HS-SCCH power. Operations 700 begin with the determination of the presence of an HS-SCCH signal, and the performance of CRC checks from the HS-SCCH and HS-DSCH signals in step 702. Step 702 is described in further detail with reference to FIG. 8. In step 704 an estimated SNR is determined. Although shown in series, step 704 may be performed in parallel to step 702 as this process uses the CPICH not HS-SCCH or HS-PDSCH. Then in step 706 an SNR correction is determined. The SNR correction may be based on the presence of the HS-SCCH signal or other factors as described with reference to FIG. 4. In addition to the presence of the HS-SCCH signal, the HS-DSCH (ACK/NACK) and DTX may be used to determine the SNR correction as well. The SNR correction is applied to the estimated SNR in step 708. In step 710 the CQI report may be generated based on the corrected estimated SNR. This allows an HSDPA capable UE to better provide a better indication of the received signal in order to optimize data exchange between Node B and the UE.

Figure 8:
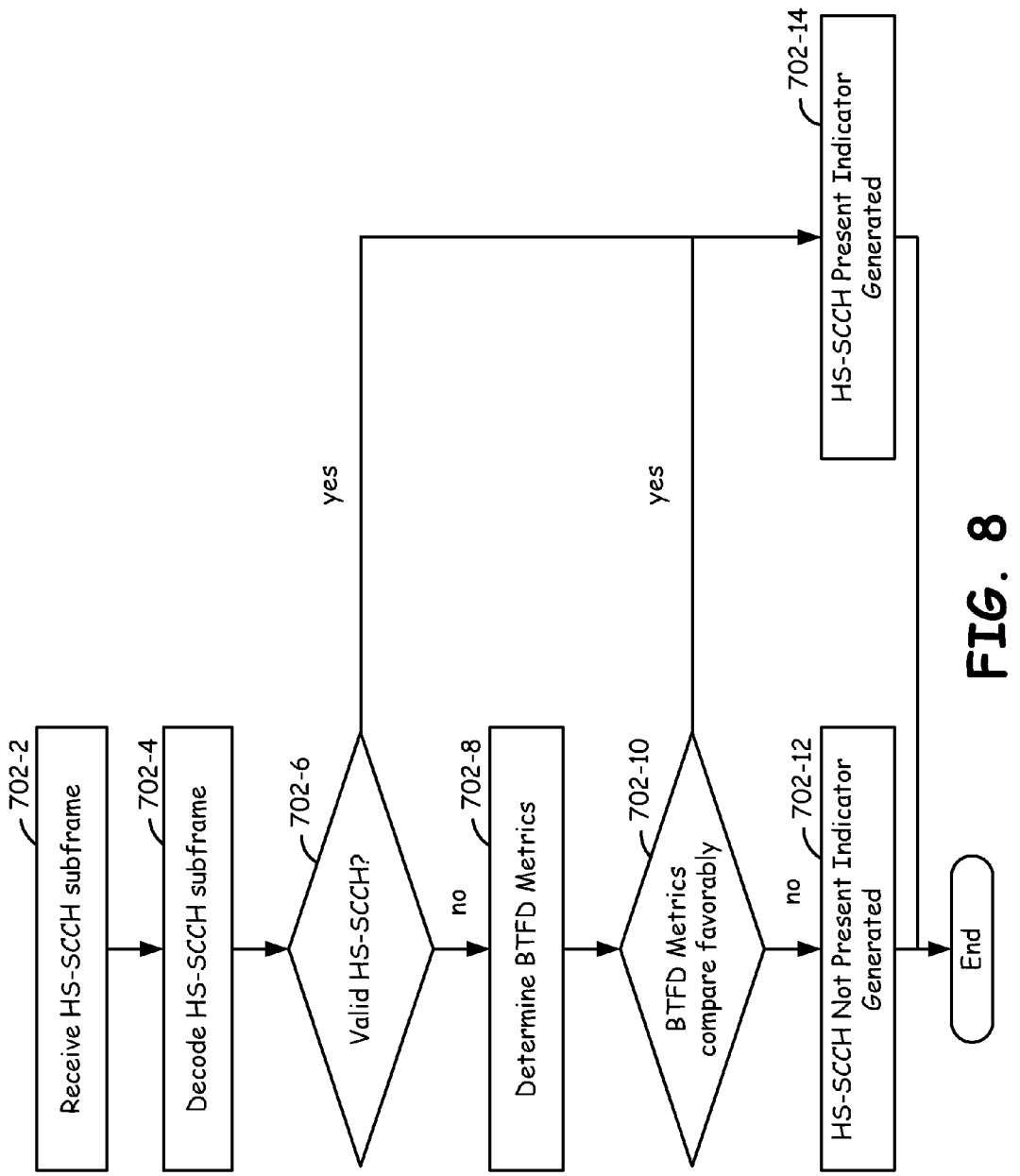
FIG. 8 describes HS-SCCH presence indication in further detail in accordance with embodiments of the present invention.

FIG. 8 describes step 702 in further detail. In step 702-2 the HS-SCCH subframe is received. This subframe is decoded in step 702-4. At decision point 702-6 a determination is made as to whether or not a valid HS-SCCH has been received that was intended for the UE. This may involve performing CRC checks on the received HS-SCCH sub frame to determine if it was valid. If it is valid the HS-SCCH signal is determined to be present in step 702-14. If it is not determined to be valid other metrics associated with the HS-SCCH signal may be analyzed to determine whether or not the signal was present. In step 702-8 BTFD metrics are determined. At decision point 702-10 these BTFD metrics are compared to threshold values wherein if they compare favorably the HS-SCCH signal is determined to be present in step 702-14 otherwise a finding of no HS-SCCH signal present is made in step 702-12. At decision point 702-10, a comparison is also made between BTFD metrics from slot 1 and BTFD metrics from slot 2 and 3 to determine the presence of an HS-SCCH signal. This is necessary because slot 2+3 is not masked by user ID. This information (i.e. the HS-SCCH presence indicator) may then be used by the SNR correction module to help determine the SNR correction. An HS-SCCH not present indicator means either no signal is sent on this HS-SCCH subframe or the signal sent on this HS-SCCH subframe is for other users.

The RF front end 202, the baseband processor 304, and the equalizer module 318 illustrated in FIG. 3 perform the operations identified with FIGS. 6, 7 and 8. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions may be described later.

In summary, embodiments of the present invention provide a method to adapt CQI reports from UEs. This involves first determining the presence of a HS-SCCH signal, and then checking the CRC status for HS-SCCH and HS-DSCH signals. An estimated SNR is also determined. Next an SNR correction based on the presence or lack thereof of the HS-SCCH signal is determined and applied to the estimated SNR. The CQI report is then generated based on the corrected estimated SNR. This CQI report which takes into account a corrected estimated SNR may then be used to adjust the HS-SCCH signal in an HSDPA capable telephony system.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method to adapt channel quality indicator (CQI) reports by wireless user equipment (UE), comprising:
    determining a presence of a high speed shared control channel (HS-SCCH) signal;
    performing CRC status checks for HS-SCCH and HS-DSCH signals when the HS-SCCH signal is present;
    determining an estimated signal to noise ratio (SNR);
    determining an SNR correction based on the presence of the HS-SCCH signal, wherein the SNR correction comprises:
        a fixed component; and
        a variable component, wherein the variable component comprises adjustments based on:
            received HS-SCCH subframe cyclic redundancy checks (CRC); and
            HS-SCCH presence indicator;
    applying the SNR correction to the estimated SNR; and
    generating the CQI report based on the corrected estimated SNR.

2. The method of claim 1, wherein determining the presence of a HS-SCCH signal comprises:
    receiving a HS-SCCH sub frame;
    decoding the HS-SCCH to identify a valid HS-SCCH sub frame intended for the UE;
    determining that a HS-SCCH signal is present when a valid HS-SCCH is received by the UE; and
    determining that a HS-SCCH signal is not present when no valid HS-SCCH signal is received.

3. The method of claim 2, wherein determining the presence of a HS-SCCH signal further comprises:
    determining blind transport format detection (BTFD) metrics for the HS-SCCH sub frame, wherein the BTFD metrics include slot 1 and slot 2 and 3 metrics;
    comparing the BTFD metrics to threshold values, wherein:
        a HS-SCCH is present when the BTFD metrics compare favorably to the threshold values; and
        a HS-SCCH is not present when the BTFD metrics compare unfavorably to the threshold values received by the UE; and
    comparing the BTFD metrics associated with slot 1 to BTFD metrics associated with slot 2 and slot 3 to determine the presence of an HS-SCCH signal.

4. The method of claim 1, wherein the estimated SNR is based on the common pilot channel (CPICH).

5. The method of claim 1, wherein the variable component comprises further adjustments based on received:
    high speed downlink shared transport channel (HS-DSCH) acknowledgement (ACK);
    HS-DSCH negative acknowledgement (NACK); and
    discontinuous transmission (DTX) due to compressed mode.

6. The method of claim 1, wherein the SNR correction has an upper limit and a lower limit.

7. The method of claim 1, further comprising adjusting HS-SCCH power at node B based on the CQI report.

8. A method to adjust high speed shared control channel (HS-SCCH) signal power using adapted channel quality indicator (CQI) reports by wireless user equipment (UE), comprising:
    determining a presence of a high speed shared control channel (HS-SCCH) signal at the UE;
    performing CRC status checks for HS-SCCH and HS-DSCH signals when the HS-SCCH signal is present;
    determining an estimated signal to noise ratio (SNR) at the UE;
    determining an SNR correction based on the presence of the HS-SCCH signal, wherein the SNR correction comprises:
        a fixed component; and
        a variable component, wherein the variable component comprises adjustments based on:
            received HS-SCCH subframe cyclic redundancy checks (CRC);
            HS-SCCH presence indicator;
            high speed downlink shared transport channel (HS-DSCH) acknowledgement (ACK);
            HS-DSCH negative acknowledgement (NACK); and discontinuous transmission (DTX) due to a compressed mode;
applying the SNR correction the estimated SNR;
generating the CQI report based on the corrected estimated SNR; and
reporting the CQI report to Node B for adjusting the HS-SCCH signal power based on the CQI report.

9. The method of claim 8, wherein determining the presence of a HS-SCCH signal comprises:
receiving a HS-SCCH sub frame;
decoding the HS-SCCH to identify a valid HS-SCCH sub frame intended for the UE; and
determining that a HS-SCCH signal is present when a valid HS-SCCH is received by the UE; and
determining that a HS-SCCH signal is not present when no valid HS-SCCH signal is received.

10. The method of claim 9, wherein determining the presence of a HS-SCCH signal further comprises:
determining blind transport format detection (BTFD) metrics for the HS-SCCH sub frame, wherein the BTFD metrics include slot 1 and slot 2 and 3 metrics;
comparing the BTFD metrics to threshold values, wherein:
a HS-SCCH is present when the BTFD metrics compare favorably to the threshold values; and
a HS-SCCH is not present when the BTFD metrics compare unfavorably to the threshold values received by the UE; and
comparing the BTFD metrics associated with slot 1 to BTFD metrics associated with slot 2 and slot 3 to determine the presence of an HS-SCCH signal.

11. The method of claim 8, wherein the estimated SNR is based on the common pilot channel (CPICH).

12. The method of claim 8, wherein the SNR correction comprises:
a plurality of up step sizes; and
a plurality of down step sizes, wherein the up step size or down step size selected are selected based on the presence of the HS-SCCH signal, HS-SCCH signal CRC checks and/or HS-DSCH signal CRC checks.

13. The method of claim 12, wherein step sizes are determined by at least one of the following:
quality target of the HS-SCCH;
quality target of the HS-DSCH; and
quality target of the PDSCH.

14. The method of claim 8, wherein the SNR correction has an upper limit and a lower limit, wherein the SNR correction may be clipped to remain within the upper limit and the lower limit.

15. A wireless terminal, comprising:
a Radio Frequency (RF) front end;
a baseband processor communicatively coupled to the RF front end wherein the baseband processor is operable to:
determine a presence of a high speed shared control channel (HS-SCCH) signal;
perform CRC checks for HS-SCCH and HS-DSCH signals when the HS-SCCH signal is present;
determine an estimated signal to noise ratio (SNR);
determine an SNR correction based on the presence of the HS-SCCH signal, wherein the SNR correction has an upper limit and a lower limit, wherein the SNR correction may be clipped to remain within the upper limit and the lower limit;
wherein the SNR correction comprises:
a fixed component; and
a variable component, wherein the variable component comprises adjustments based on:
received HS-SCCH subframe cyclic redundancy checks (CRC); and
HS-SCCH presence indicator high speed downlink shared transport channel (HS-DSCH) acknowledgement (ACK);
HS-DSCH negative acknowledgement (NACK); and
discontinuous transmission (DTX) due to compressed mode;
apply the SNR correction the estimated SNR; and
generate the CQI report based on the corrected estimated SNR, wherein the CQI report is transmitted by the wireless terminal to a servicing Node B.

16. The wireless terminal of claim 15, wherein the wireless terminal determines the presence of a HS-SCCH signal by:
receiving a HS-SCCH sub frame;
decoding the HS-SCCH to identify a valid HS-SCCH sub frame intended for the UE; and
determining that a HS-SCCH signal is present when a valid HS-SCCH is received by the UE; and
determining that a HS-SCCH signal is not present when no valid HS-SCCH signal is received.

17. The wireless terminal of claim 15, wherein the wireless terminal further determines the presence of a HS-SCCH signal by:
determining blind transport format detection (BTFD) metrics for the HS-SCCH subframe, wherein the BTFD metrics include slot 1 and slot 2 and 3 metrics;
comparing the BTFD metrics to threshold values, wherein:
a HS-SCCH is present when the BTFD metrics compare favorably to the threshold values; and
a HS-SCCH is not present when the BTFD metrics compare unfavorably to the threshold values received by the UE; and
comparing the BTFD metrics associated with slot 1 to BTFD metrics associated with slot 2 and slot 3 to determine the presence of an HS-SCCH signal.

18. The wireless terminal of claim 15, wherein the estimated SNR is based on the common pilot channel (CPICH).

19. The wireless terminal of claim 15, wherein the wireless terminal is operable to manipulate node B to adjust HS-SCCH power at node B based on the CQI report.

20. The wireless terminal of claim 15, wherein the SNR correction comprises:
a plurality of up step sizes; and
a plurality of down step sizes, wherein the up step size or down step size selected is selected based on the presence of the HS-SCCH signal, HS-SCCH signal CRC checks and/or HS-DSCH signal CRC checks.

* * * * *